United States Patent
Kaus

[11] Patent Number: 6,157,438
[45] Date of Patent: Dec. 5, 2000

[54] FILM SCANNER WITH PRISM FOR SCANNING SPROCKET HOLES

[75] Inventor: Rainer Kaus, Hochheim, Germany

[73] Assignee: U.S. Philips Corporation, New York, N.Y.

[21] Appl. No.: 09/276,175

[22] Filed: Mar. 25, 1999

[30] Foreign Application Priority Data

Mar. 25, 1998 [DE] Germany ............................ 198 13 126

[51] Int. Cl.[7] .................................................. H04N 5/253
[52] U.S. Cl. ................................ 355/41; 355/18; 348/97; 250/559.02; 352/92
[58] Field of Search .................................. 348/96, 97, 98, 348/208; 358/506, 527, 487; 352/92, 236, 241; 355/40, 41, 18; 250/559.02

[56] References Cited

U.S. PATENT DOCUMENTS

| | | | |
|---|---|---|---|
| 3,578,852 | 5/1971 | Aldridge | 352/92 |
| 3,794,416 | 2/1974 | Johnston | 352/92 |
| 4,855,836 | 8/1989 | Shearer | 358/214 |
| 4,875,102 | 10/1989 | Poetsch | 358/214 |
| 5,194,958 | 3/1993 | Pearman et al. | 358/214 |
| 5,565,912 | 10/1996 | Easterly et al. | 352/236 |
| 5,734,171 | 3/1998 | Witte | 250/559.02 |

*Primary Examiner*—Alan A. Mathews
*Attorney, Agent, or Firm*—Gregory L. Thorne

[57] ABSTRACT

In a film scanner comprising a device for scanning sprocket holes, a projection device is proposed, by means of which the images of two sprocket holes are projected on one sensor. This provides the possibility of scanning two facing sprocket holes with only one camera.

6 Claims, 2 Drawing Sheets

FILM SCANNER WITH PRISM FOR SCANNING SPROCKET HOLES

BACKGROUND OF THE INVENTION

The invention relates to a film scanner comprising a device for scanning sprocket holes.

In film scanners, the sprocket holes of a film are often optically scanned for deriving correction signals to control the transport speed or the frame position. For example, U.S. Pat. No. 4,855,836 discloses a film scanner in which a further arrangement for optically scanning the sprocket holes of the film is arranged proximate to an arrangement for optically scanning the film frames. In this film scanner, the arrangement for optically scanning the sprocket holes comprises both a light source for incident light illumination of the sprocket holes and an optical scanner for scanning the sprocket holes. The film is guided by means of a roll having guidance pins on its sides.

Ideally, the sprocket holes which were used in the pick-up camera for positioning the film frame should be scanned when scanning sprocket holes. In the majority of film material to be scanned, this is the pair of sprocket holes preceding the film frame and a generally denoted as Mitchell holes. Since the Mitchell holes are particularly very proximate to the film frame to be scanned, a direct scanning of the Mitchell holes has special difficulties. Frequently, there is no place left to provide an illumination source or a camera for scanning the Mitchell holes, because it is exactly in this area where the film frame is guided by guiding elements for mechanically improving the frame position. Arranging illumination sources and sprocket hole scanners at this position may also be obstructed by the film scanning head which is used for scanning the film frame.

SUMMARY OF THE INVENTION

It is an object of the invention to provide a film scanner in which the scanning of sprocket holes is simplified.

This object is achieved in that a projection device is provided, by means of which the images of two sprocket holes are projected on one sensor. The sprocket holes may be imaged directly side by side or one over the other.

This solution has the advantage that only one sensor is required for scanning the sprocket holes. Since the distance between the projected sprocket holes is smaller than their distance on the relevant film frame, the scanning can be effected with a maximal resolution of the sensor for both sprocket holes.

The images of the sprocket holes are preferably projected one over the other, the images having a mutual rotational offset of preferably 90°.

In this way, both sprocket holes can be detected simultaneously and with the same resolution with which a single sprocket hole can be scanned.

These and other aspects of the invention are apparent from and will be elucidated with reference to the embodiments described hereinafter.

DETAILED DESCRIPTION OF THE PREFERRED EMBODIMENTS

Figure 1:
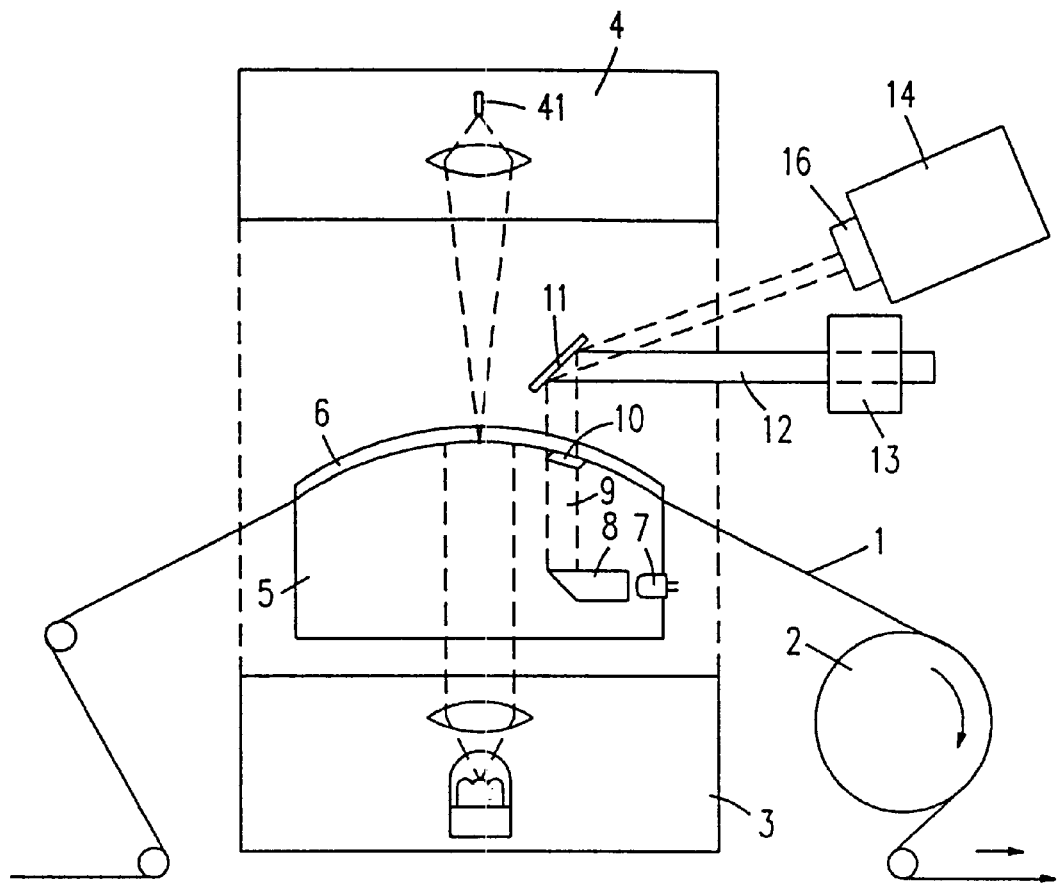
FIG. 1 shows a film scanner.

In the embodiment shown in FIG. 1, a film 1 is continuously scanned in a film scanner. To this end, the film 1 to be scanned is driven by means of a capstan 2 and passed between an illumination source 3 for transilluminating the film frame and a frame sensor 4. In this embodiment, illumination source 3 and frame sensor 4 constitute a constructive unit which will hereinafter be referred to as scanning head. Due to the constructive unit of illumination source 3 and frame sensor 4, this unit may be exchanged in one piece for another scanning head used to scan, for example a different film format.

For guiding the film I within the scanning head 3, 4, the film I runs along a curved path on a film carrier device 5. This path is enforced by means of bended guiding elements 6 engaging the film outside the film frames and along which the film glides. To illuminate the sprocket holes, infrared light is used in the embodiment which, surprisingly, images the edges of the sprocket holes with a particularly rich contrast. This infrared light is generated by means of one infrared diode 7. The infrared diode 7 is loosely (coupled to an optical waveguide 8 which guides the light of the infrared diode to recesses 9 within the bended guiding elements 6. The recesses 9 are closed by means of optically transparent cover 10 so that the recesses 9 are not contaminated by dirt caused by film abrasion. In this way, the guiding elements 6 can be implemented completely freely for an optimum film travel without constructive restrictions in favor of illuminating the sprocket holes.

An optical diverting device by means of which the images of the sprocket hole concerned are guided to a spatially offset line camera 14 is arranged above the exit face of the infrared light. In the embodiment, this optical diverting device consists of an adjustable mirror 11 which is fixed to a supporting rod 12 which in turn is secured by means of a holding device 13 arranged outside the scanning head.

In the embodiment, the supporting rod 12 is made of a round rod whose outer surface is milled in the form of a segment on its longitudinal side. In this way, the round rod may be displaced in the longitudinal direction and slid free from rotation into a corresponding prepared recess of the holding device and, for example, detachably connected to the holding device 13 by means of a screw which is not shown for the sake of clarity. Before exchanging the optical scanning head 3, 4, the supporting rod 12 together with the diverting mirror 11 can be removed after disengaging the screw. After a scanning head 3, 4 has been arranged again, the supporting rod is slid into its holding device and the screw is tightened. Due to the rotationally secure implementation of the supporting rod 12, the supporting rod 12 and the diverting mirror 11 rigidly connected to the supporting rod need only be adjusted by axial displacement after the supporting rod 12 has been placed in the holding device 13; an adjustment with respect to other spatial axes is not necessary.

Figure 2:
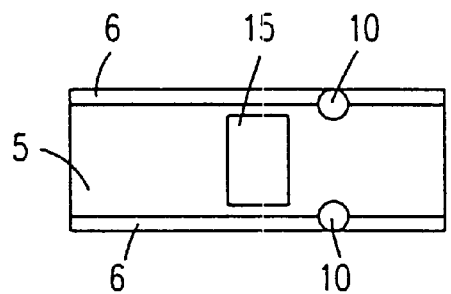
FIG. 2 shows a film carrier device with guiding elements in a plan view.

With the scanning of two facing sprocket holes, not only a vertical and horizontal steadiness correction can be used but also an angle offset between the two sprocket holes for the purpose of correcting shearing or rotational errors of the frame position. FIG. 2 is a plan view of a film carrier device 5 implemented accordingly, with respective recesses under the two covers 10 in the left and right guiding element 6 for illuminating two facing sprocket holes. FIG. 2 also shows the film window 15 through which the film frame to be scanned is transilluminated by the subjacent illumination device.

Figure 3:
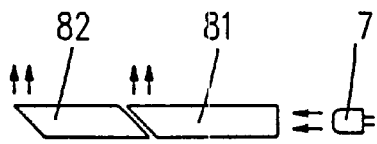
FIG. 3 is a longitudinal section of a preferred optical waveguide.

FIG. 3 shows an arrangement composed of two optical waveguide elements 81 and 82 suitable for simultaneous illumination of two sprocket holes. In the embodiment, the optical waveguide elements are made of glass. The infrared diode 7 is arranged at one end of the first optical waveguide element 81. The optical waveguide elements which may be made of, for example, glass rods, also ensure that the light at the exit faces is diffuse so that they also simultaneously compensate radiation inhomogeneities through the cross-section of the infrared diode 7. The other end of the first optical waveguide element 81 is beveled at an angle of 45° and vapor-deposited with metal in such a way that it is optically semitransparent at this position. It is cemented with the end of the second optical waveguide element 82 which is also beveled at an angle of 45°. In this way, the light current of the infrared diode 7 is split up into two parts and may thus be used for illuminating the two sprocket holes. The second end of the second optical waveguide element 82 is also beveled at an angle of 45° but is vapor-deposited in such a way that it is fully reflective. The light is thus substantially completely coupled out towards the second recess.

Figure 4:
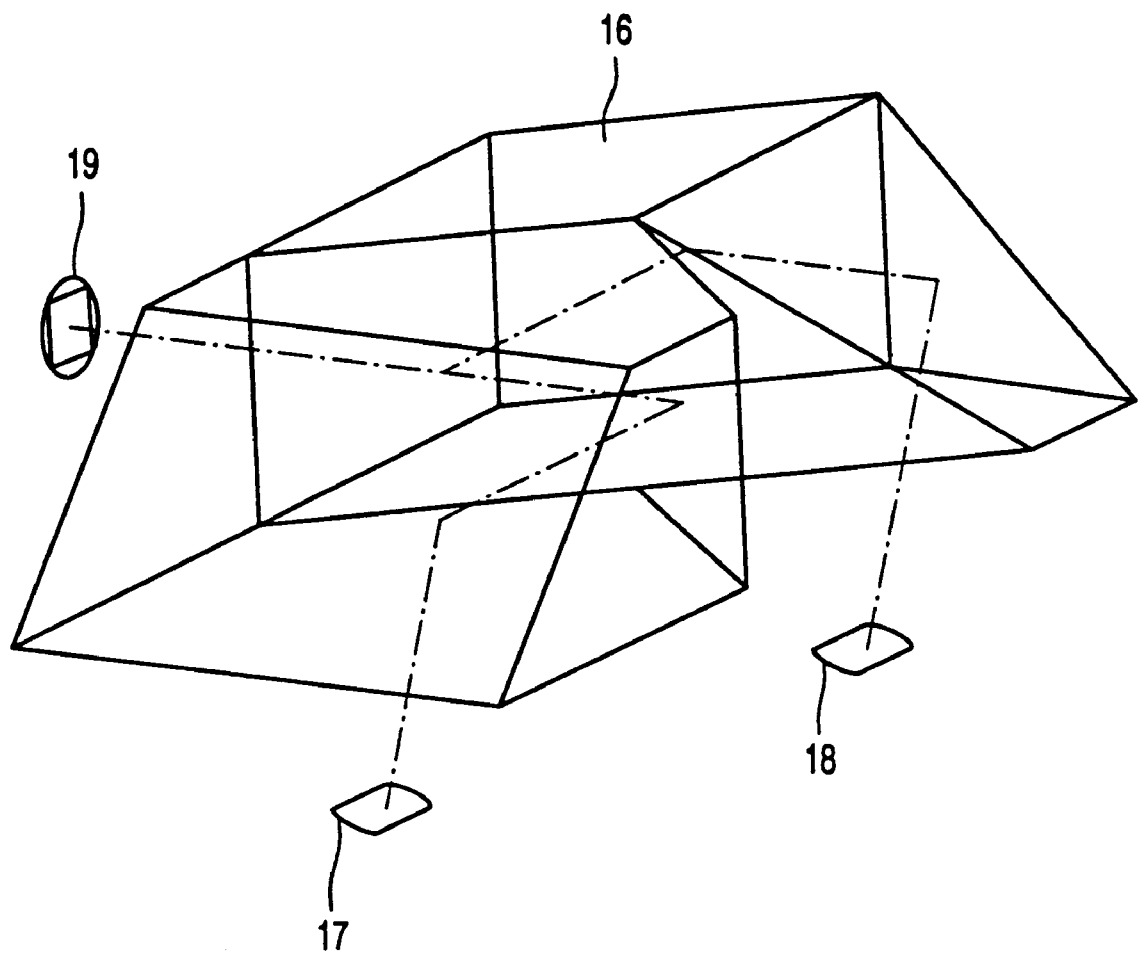
FIG. 4 shows a prism.

To detect two sprocket holes, two separate line cameras can be, used. Since suitable line cameras are, however, expensive, the single line camera 14 is preceded by a prism 16 by means of which the two images of the facing sprocket holes 17,18 are imaged on the one line camera 14. FIG. 4 shows such a prism as a wire grid and the image 19 of the two scanned sprocket holes, generated by this prism. Another advantage of using a projection device like the said prism 16 is that the position of the two images in reference to each other is fixed for all times. As optical devices could be maintained with high precision there is even no need to adjust the images of the two sprocket holes in reference to each other.

What is claimed is:

1. A film scanner comprising a scanning device for scanning sprocket holes, characterized in that a projection device is provided, by means of which the images of at least two sprocket holes can be applied to a single scanning device wherein the projection device is configured such that the images of the sprocket holes are projected one over the other.

2. A film scanner as claimed in claim 1, characterized in that the projection device (16) is implemented in such a way that the images of the sprocket holes have a shorter distance to each other than on the film to be scanned.

3. A film scanner as claimed in claim 1, characterized in that the sprocket holes projected one over the other have a rotational offset.

4. A method for scanning film sprocket holes comprising projecting images of at least two sprocket holes to a single scanning device such that the images of the sprocket holes are projected one over the other.

5. The method of claim 4, wherein projecting comprises projecting in such a way that the images of the sprocket holes have a shorter distance to each other than on the scanned film.

6. The method of claim 4, wherein projecting comprising projecting in such a way that the projected image of the sprocket holes have a rotational offset substantially of 90°.

* * * * *